(12) United States Patent
Nishioka et al.

(10) Patent No.: US 7,843,785 B2
(45) Date of Patent: Nov. 30, 2010

(54) MEDIA PROCESSOR STORING MEDIA DISPOSAL HISTORY AND CONTROL METHOD OF MEDIA PROCESSOR

(75) Inventors: Atsushi Nishioka, Shiojiri (JP); Kenichiro Arai, Shiojiri (JP); Hidetoshi Maeshima, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 489 days.

(21) Appl. No.: 11/914,491

(22) PCT Filed: May 15, 2006

(86) PCT No.: PCT/JP2006/309682

§ 371 (c)(1),
(2), (4) Date: Nov. 15, 2007

(87) PCT Pub. No.: WO2006/129470

PCT Pub. Date: Dec. 7, 2006

(65) Prior Publication Data

US 2009/0092022 A1    Apr. 9, 2009

(30) Foreign Application Priority Data

May 30, 2005    (JP) .......................... P2005-156713

(51) Int. Cl.
*G11B 15/04* (2006.01)

(52) U.S. Cl. .................................. 369/53.2; 369/53.37

(58) Field of Classification Search .................. None
See application file for complete search history.

(56) References Cited

U.S. PATENT DOCUMENTS

| | | | |
|---|---|---|---|
| 5,914,918 A | 6/1999 | Lee et al. | |
| 5,946,216 A | 8/1999 | Hollerich | |
| 5,956,311 A | 9/1999 | Kawai | |
| 6,400,659 B1 | 6/2002 | Kitaoka | |
| 2003/0182156 A1* | 9/2003 | Bock | 705/1 |
| 2005/0125355 A1 | 6/2005 | Fein | |

FOREIGN PATENT DOCUMENTS

| | | |
|---|---|---|
| JP | 10-214424 | 8/1998 |
| JP | 11-58713 | 3/1999 |
| JP | 2000-155949 | 6/2000 |
| JP | 2000-260172 | 9/2000 |
| JP | 2001-344760 | 12/2001 |
| JP | 2002-316321 | 10/2002 |
| JP | 2003-248745 | 9/2003 |
| JP | 2004-62964 | 2/2004 |
| JP | 2005-85315 | 3/2005 |
| JP | 2005-149614 | 6/2005 |

* cited by examiner

*Primary Examiner*—Paul Huber
(74) *Attorney, Agent, or Firm*—Nixon & Vanderhye P.C.

(57) ABSTRACT

A media processor is capable of keeping disposal history of media regardless of whether the media is externally created media or not. In the media processor, while used media set in a created media storage unit is being conveyed to a media disposal mechanism by a media conveying mechanism, a label surface image printed on a label surface of the media is read by a line sensor. Subsequently, the media is disposed of by the media disposal mechanism such that reading and writing are not possible. In a storage unit, the read image printed on the label surface is stored as media disposal history.

8 Claims, 6 Drawing Sheets

MEDIA PROCESSOR STORING MEDIA DISPOSAL HISTORY AND CONTROL METHOD OF MEDIA PROCESSOR

This application is the U.S. national phase of International Application No. PCT/JP2006/309682 filed 15 May 2006 which designated the U.S. and claims priority to Japanese Patent Application No. 2005-156713 filed 30 May 2005, the entire contents of each of which are hereby incorporated by reference.

TECHNICAL FIELD

The present invention relates to a media processor used to dispose of unnecessary media, such as a CD and a DVD, such that the unnecessary media cannot be used any more, and in particular, to a media processor capable of keeping a media disposal history.

BACKGROUND ART

Media, such as a CD and a DVD, written with data are used to transfer data. Particularly in the case of a large amount of data, exchanging data is performed using such media instead of a document.

Media written with data, a CD for example, is created by a media processor called a CD publisher. The CD publisher creates a CD by supplying a blank CD stored in a blank media stacker to a CD drive, writing predetermined data, and then performing printing on a label surface of the CD by means of a label printer. For example, Patent Document 1 discloses such publisher.

In order to prevent media which are not needed any more after use from being improperly disposed, it is necessary to dispose of the media by means of a media processor called a crusher or the like such that reading and writing of data are not possible. Apparatuses for disposing of CDs are disclosed in Patent Documents 2 to 4. In addition, Patent Document 5 discloses a method of performing management of the quality, location, and purchase/discard of a recording medium using a label with an identification code.

Patent Document 1: U.S. Pat. No. 5,914,918

Patent Document 2: Japanese Patent Publication No. 2004-62964A

Patent Document 3: Japanese Patent Publication No. 10-214424A

Patent Document 4: Japanese Patent Publication No. 2002-316321A

Patent Document 5; Japanese Patent Publication No. 2003-248745A

DISCLOSURE OF THE INVENTION

Problems to be Solved by the Invention

In the case of handling secret data, it is desirable to be able to check that used media written with such data were reliably disposed of. However, a media processor for media disposal, which is used in the related art, has only a function of media disposal and a disposal history is not maintained.

In general, media IDs are also written in the media, such as CDs, together with data. Accordingly, it is possible to specify the media by using a media drive. However, for example, in the case of media created externally, media IDs may not be read. Accordingly, a method of reading media IDs and keeping a disposal history of the media is not practical. Even in the method of managing a recording medium disclosed in Patent Document 5, it is not possible to specify individual storage media with a recording medium without an identification code. Accordingly, it is difficult to keep the disposal history.

In view of the above problems, it is an object of the present invention to propose a media processor capable of keeping disposal history of media with the simple configuration regardless of whether the media is media created externally or not.

Means for Solving the Problem

According to a first aspect of the present invention, a media processor comprises: a media disposal means for disposing of media, such as a CD and a DVD, so as to make writing and reading of data impossible; and an image reading means for reading a label surface image printed on a label surface of the media.

According to a second aspect of the present invention, in the media processor according to the first aspect of the present invention, the media are disposed of by the media disposal means after the label surface image is read by the image reading means.

According to a third aspect of the present invention, the media processor according to the first or second aspect of the present invention further comprises a reading means for reading media identification information included in the label surface image read by the image reading means.

According to a fourth aspect of the present invention, the media processor according to any one of the first to third aspects of the present invention further comprises a storage means for storing the label surface image as media disposal history.

According to a fifth aspect of the present invention, the media processor according to any one of the first to fourth aspects of the present invention further comprises an output means for outputting the label surface image.

According to a sixth aspect of the present invention, the media processor according to any one of the first to fifth aspects of the present invention further comprises a media drive that performs writing and reading of data with respect to the media; and a label printing means for performing printing on the label surface of the media.

According to a seventh aspect of the present invention, the media processor according to the sixth aspect of the present invention further comprises: a media storage means for storing unused blank media; a written media storage means for storing media in which data is written by the media drive; and a disposed media storage means for storing media disposed of by the media disposal means.

According to an eighth aspect of the present invention, a control method of a media processor that writes data into media, such as a CD and a DVD, and reads written data, comprises: a reading step of reading a label surface image printed on a label surface of the media in response to a command of disposal of the media; and a disposal step of disposing of the media so as to make writing and reading of data impossible.

According to a ninth aspect of the present invention, in the control method of a media processor according to the eighth aspect of the present invention, media identification information included in the label surface image is read in the reading step.

According to a tenth aspect of the present invention, the control method of a media processor according to the eighth or ninth aspect of the present invention further comprises a storage step of storing the label surface image as media disposal history.

According to an eleventh aspect of the present invention, the control method of a media processor according to any one of the eighth to tenth aspects of the present invention further comprises: a writing step of writing data into the media; and a printing step of performing printing on a label surface of the media.

In the present invention, it is possible to read a label surface image of media to be disposed of. In addition, since the label surface image of the media to be disposed of is read by the image reading means and then disposed of by the media disposal means, disposal history of all media that are disposed of may be stored if the read label images are stored. Moreover, since a label image of media created externally can also be read, it is possible to reliably keep disposal history of media regardless of whether the media is media created externally or not.

Further, according to the media processor and the control method of a media processor of the present invention, the media identification information included in the read label surface image is read. Accordingly, since a media ID printed on a label surface of media as media identification information can be read from the read label image information, it is possible to reliably specify disposed media.

Furthermore, according to the media processor and the control method of a media processor of the present invention, the label surface image is stored as the media disposal history. Accordingly, the media disposal history can be stored inside the media processor.

Furthermore, since the media processor of the present invention includes the output means for outputting a label surface image, authorized equipment communicably connected to the media processor or the like may refer to the media disposal history stored in the storage means. Further, by referring to an image printed on a label surface, written data of disposed media can also be checked through a title and the like of the written data printed on the label surface. In addition, since the media processor can also transmit the media disposal history through the output means in response to a request from the authorized equipment, the media disposal history may be managed in the authorized equipment and the like.

In addition, the media disposal history may include date and time of disposal, a person in charge of the disposal, and the like of individual media that are disposed of.

The present invention may also be applied to a media processor having a function of creating media written with predetermined data. In this case, in addition to the configuration described above, the media processor of the present invention includes the media drive, which performs writing and reading of data with respect to media, and the label printing means for performing printing on a label surface of the media. In addition, the control method of a media processor of the present invention includes the writing step of performing writing of data and the printing step of performing printing on a label surface of media. Accordingly, as for media on which data writing and label printing processing was performed, when the media are not needed any more and are disposed of as used media by the media disposal means, management from creation of the media to discard of the media can be performed. Accordingly, the control method of a media processor of the present invention is suitable for handling media in which secret data or the like is written.

In addition, since the media processor according to the present invention includes the media storage means for storing unused blank media, the written media storage means for storing media in which data is written by the media drive, and a disposed media storage means for storing media disposed of by the media disposal means, media in different states can be stored so as to be clearly distinguished from each other. Moreover, when there is a plurality of sheets of media to be disposed of, the plurality of sheets of media can be accumulated in the disposed media storage means and then collectively taken out.

Effects of the Invention

The media processor of the present invention includes the image reading means for reading a label surface image of media. Accordingly, it is possible to keep the label surface image of media to be disposed of as a history of disposed media. As a result, for example, in the case of disposing of media written with secret data, the data management can be reliably performed on the basis of the history of disposed media.

BEST MODE FOR CARRYING OUT THE INVENTION

Example of a Specific Configuration of a CD Publisher

Figure 1:
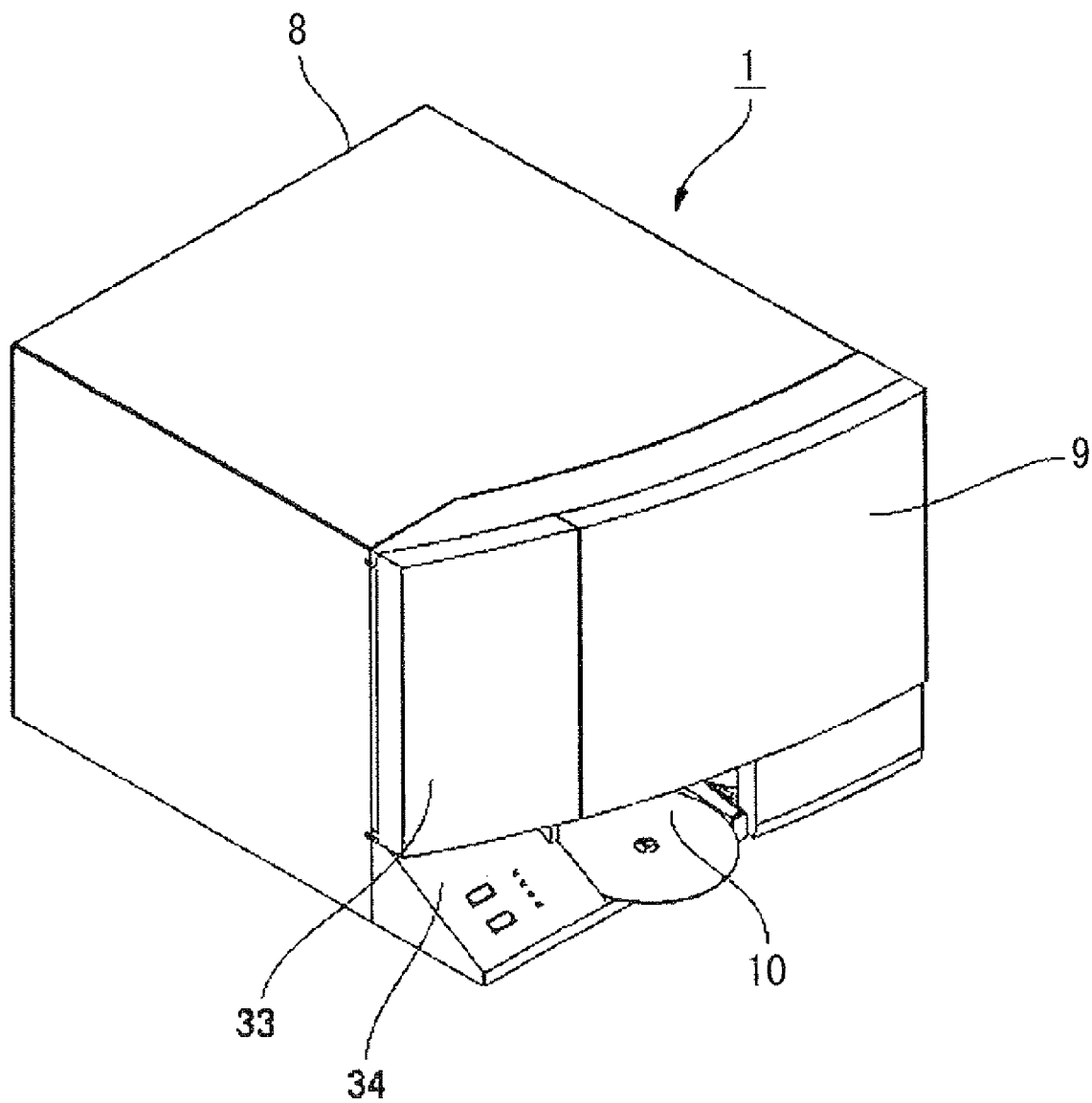
FIG. 1 is a perspective view illustrating the outer appearance of a CD publisher.

Hereinafter, an embodiment of a media processor to which the present invention is applied will be described with reference to the accompanying drawings. FIG. 1 is a perspective view illustrating the outer appearance of a CD publisher (media processor).

The CD publisher 1 (hereinafter, referred to as a 'publisher 1') includes a case 8 having approximately a rectangular parallelepiped shape. Doors 9 and 33 that can be opened and closed left and right are provided on a front face of the case 8. An operation surface 34 on which a display lamp, an operation button, and the like are arranged is formed on a lower right end part of the doors 9 and 33, and a media outlet 10 is open in the vicinity of the operation surface 34.

Figure 2:
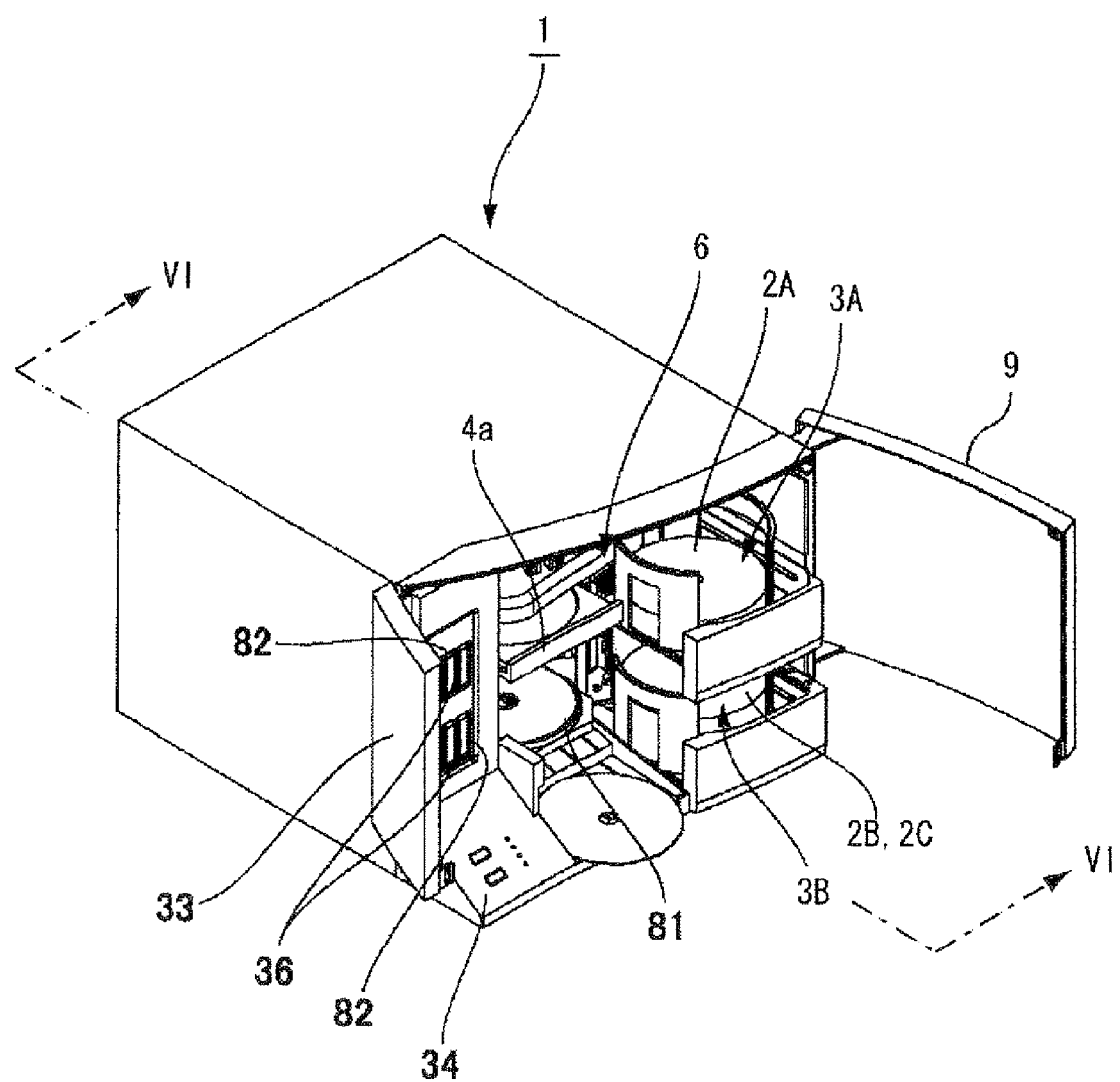
FIG. 2 is a perspective view illustrating the CD publisher shown in FIG. 1 in a state where doors are opened.

FIG. 2 is a perspective view illustrating the CD publisher 1 in a state where the doors 9 and 33 are opened. The left door 9 is locked in a closed state, and a read part for biometric recognition (not shown), for example, a fingerprint sensor, is provided on the operation surface 34 so that the left door 32 can be opened and closed only by a pre-authorized person. In addition, the left door 32 may be opened and closed by a command from authorized equipment 16 (refer to FIG. 6) that is connected to the CD publisher 1 so as to be able to communicate with the CD publisher 1. In contrast, the right door 33 is opened and closed at the time of replacement of an ink cartridge of a label printer 5 (refer to FIGS. 3 and 4), which will be described later, and a cartridge mounting part 36 is exposed if the door 33 is opened. In this example, the cartridge mounting part 36 includes two upper and lower stages.

Figure 3:
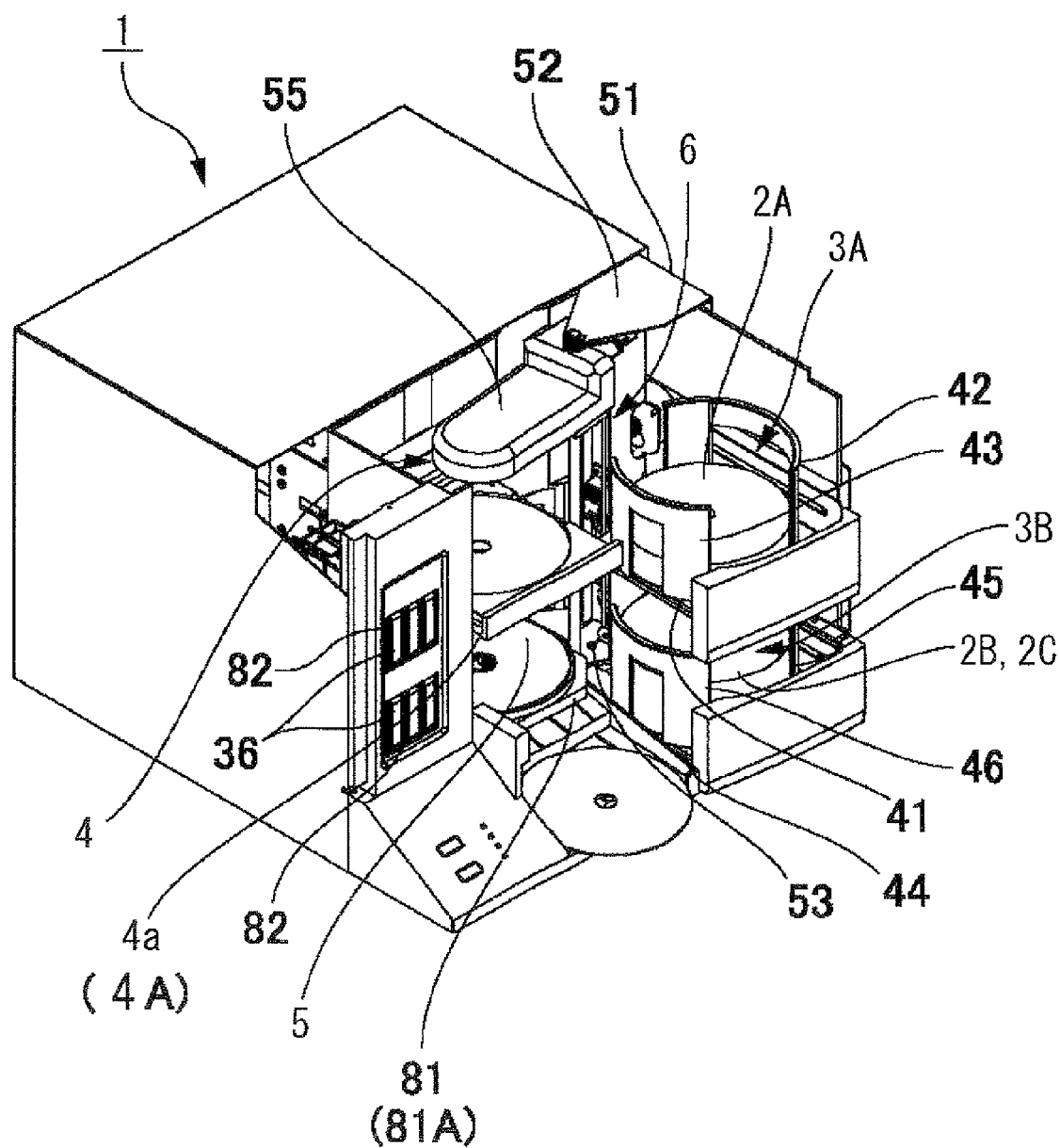
FIG. 3 is a perspective view illustrating the internal structure of the CD publisher shown in FIG. 1.

FIG. 3 is a perspective view illustrating the CD publisher 1 in a state where a part of the case 8 and the doors 9 and 33 are removed.

An explanation will now be made with reference to FIGS. 2 and 3. In a left part inside the case 8 of the CD publisher 1, a blank media storage unit 3A, in which a plurality of sheets of unused blank media 2A that are not subjected to data writing processing are stackable, and a created media storage unit 3B, in which created media 2B are stored, are disposed above and below each other in a coaxial state. The blank media storage unit 3A includes a slide plate 41, which can be horizontally pulled out, and a pair of left and right casing boards 42 and 43 that are vertically disposed on the slide plate 41 and have a circular arc shape. Thus, a stacker in which CDs can be placed from above and the CDs can be stored stacked in a coaxial state is formed. An operation of placing the blank media 2A in the blank media storage unit 3A or filling up the blank media storage unit 3A with the blank media 2A may be simply performed by opening the door 9 and pulling out the slide plate 41.

The lower created media storage unit 3B also has the same structure as described above. That is, the created media storage unit 3B includes a slide plate 44, which can be horizontally pulled out, and a pair of left and right casing boards 45 and 46 that are vertically disposed on the slide plate 44 and have a circular arc shape. Thus, a stacker in which CDs can be placed from above and the CDs can be stored stacked in a coaxial state is formed.

In the case of disposing used media 2C, it is possible to perform a disposal operation by opening the door 9 and setting the used media 2C in the created media storage unit 3B. In addition, it is also possible to take out the created media 2B (that is, media in which data writing and label surface printing are completed) from the door 9.

A media conveying mechanism 6 is disposed behind the blank media storage unit 3A and the created media storage unit 3B. The media conveying mechanism 6 includes: a chassis 51 vertically provided on the case 8; a vertical guide shaft 54 that is vertically provided between upper and lower horizontal supporting plate portions 52 and 53 of the chassis 51; and a media carrier 55 provided on the vertical guide shaft 54. The media carrier 55 can move up and down along the vertical guide shaft 54 and rotate left and right around the vertical guide shaft 54. Media 2D conveyed to the media outlet 10 by the media conveying mechanism 6 may be taken out from the media outlet 10 to the outside (refer to FIG. 6).

Beside the upper and lower storage units 3A and 3B and the media conveying mechanism 6, the media drive 4 is disposed at an upper side and the label printer 5 is disposed at a lower side. The media drive 4 has a media tray 4a that is movable between a position where data is written into a CD and a media transfer position at which a CD is transferred. In addition, the label printer 5 has a media tray 81 that is movable between a position, at which label printing on a label surface of a CD is possible, and a media transfer position at which a CD is transferred.

In FIGS. 2 and 3, a state in which the media tray 4a of the upper media drive 4 is pulled out to be at a media transfer position 4A and a state in which the media tray 81 of the lower label printer 5 exists at a media transfer position 81A on the front side are shown. Moreover, the label printer 5 is an ink jet printer, and ink cartridges 82 corresponding to respective colors are used as an ink supply source. These ink cartridges 82 are mounted in a cartridge mounting part 36 from the front side.

Here, between the pair of left and right casing boards 42 and 43 of the blank media storage unit 3A and between the pair of left and right casing boards 45 and 46 of the created media storage unit 3B, a gap that allows the media carrier 55 of the media conveying mechanism 6 to move up and down is formed. Furthermore, a gap is formed between the upper and lower storage units 3A and 3B such that the media carrier 55 can rotate horizontally to be positioned right above the blank media storage unit 3A. In addition, the media carrier 55 of the media conveying mechanism 6 can move downward so as to access the media tray 81 existing at the media transfer position if the upper media tray 4a is pushed into the media drive 4. Thus, it is possible to convey a CD to each part through an operation based on a combination of rising and falling and leftward and rightward rotation of the media carrier 55.

Figure 4:
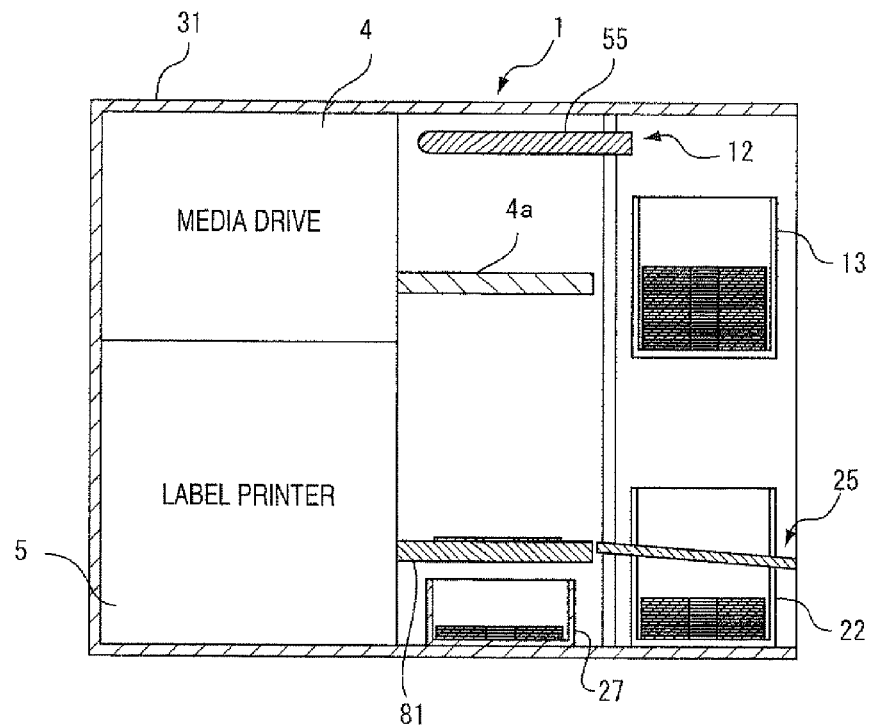
FIG. 4 is a cross-sectional view schematically illustrating the publisher taken along the line VI-VI of FIG. 2.

FIG. 4 is a cross-sectional view schematically illustrating the publisher 1 taken along the line VI-VI of FIG. 2.

As shown in FIG. 4, a disposal stacker 27 used to store a CD to be discarded is disposed below the media tray 81. For example, about 30 sheets of CDs to be discarded may be stored in the disposal stacker 27. In a state where the media tray 81 retreats from the media transfer position 81A above the disposal stacker 27 to the data writing position, a CD to be discarded may be supplied to the disposal stacker 27 by means of the media conveying mechanism 6.

To sum up, a CD is conveyed among the blank media storage unit 3A, the created media storage unit 3B, the media tray 4a of the media drive 4, and the media tray 81 of the label printer 5 through the media conveying mechanism 6.

(Mechanical Configuration of the Label Printer 5)

Figure 5:
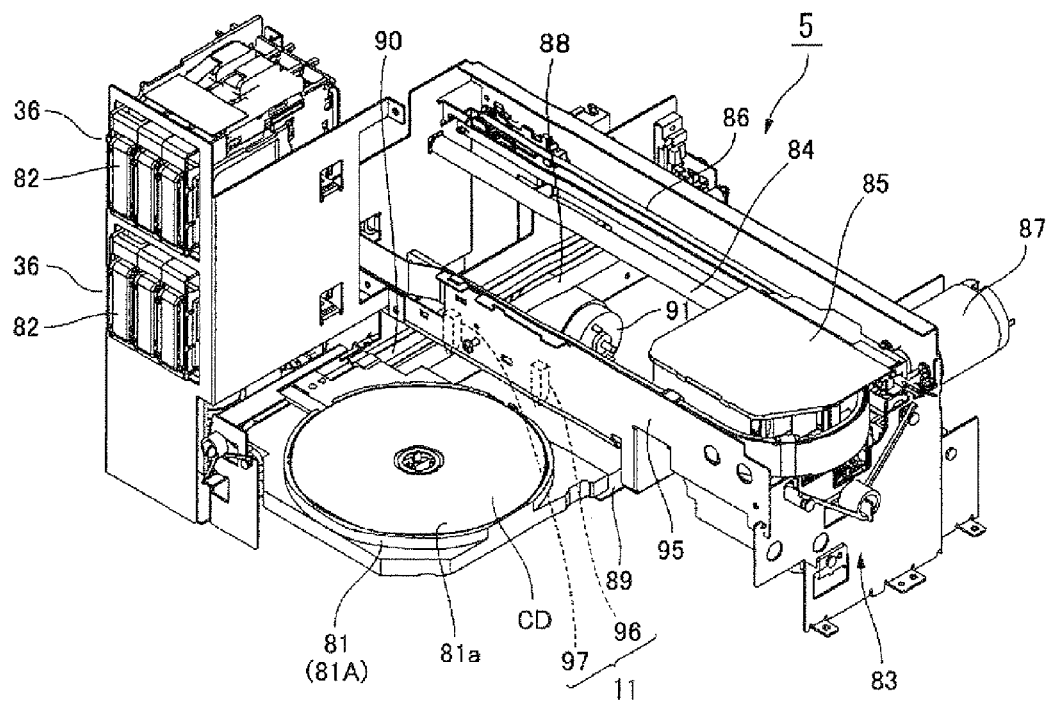
FIG. 5 is a perspective view illustrating a printer of the CD publisher shown in FIG. 1.

Next, the mechanical configuration of the label printer 5 will be described in detail. FIG. 5 is a perspective view illustrating only the label printer 5.

The label printer 5 includes a chassis 83, and a carriage guide shaft 84 is provided horizontally between left and right side plates located on a rear side of the chassis 83. A head carriage 85 on which an ink jet head (not to shown) is mounted can reciprocate in the left and right direction along the carriage guide shaft 84. A carriage driving mechanism includes a timing belt 86 that is provided horizontally in the left and right direction and a carriage motor 87 for driving the timing belt 86.

A nozzle surface of the ink jet head mounted on the head carriage 85 faces downward, and the media tray 81 can reciprocate horizontally in the front and rear directions below the ink jet head. A right end of the media tray 81 is supported by a guide shaft 88 that extends horizontally in the front and rear directions, and a left end of the media tray 81 is slidably supported by a guide rail 89 that extends horizontally in the front and rear directions. A driving mechanism of the media tray 81 also includes a timing belt 90 that is provided horizontally in the front and rear direction and a tray motor 91 for driving the timing belt 90.

The media tray 81 includes a circular shallow recess 81a, which is used to mount a CD thereon, on an upper surface of a rectangular plate. In addition, in a central portion of the recess 81a, three vertical pawls (not shown) that are arranged at a gap of 120° therebetween on the same circle are provided. The two vertical pawls can move in the radial direction as one body, the remaining vertical pawl is disposed at the fixed position. The two vertical pawls move by a driving mechanism such as an electromagnetic solenoid (not shown).

If a CD is placed on the recess 81a from above in a state in which a to printing surface, such as a label, faces upward, the three vertical pawls are inserted in a center hole of the CD. Thereafter, if the vertical pawls slightly move radially outward, the three vertical pawls are pressed against an inner peripheral surface of the center hole of the CD from the inner side. Thus, the CD is held on the media tray 81. In this state, a tray motor (not shown) is driven to move the media tray 81 backward along the guide shaft 88, thereby being able to move the media tray 81 up to a printing area of the ink jet head. Thereafter, predetermined printing can be performed on the printing surface of the CD by means of the ink jet head.

(Media Disposal Mechanism 1)

As shown in FIG. 5, a media disposal mechanism 11 (media disposal means) including a pair of left and right vertical protrusions 96 and 97 is provided on a front plate 95 in the printer chassis 83. The vertical protrusions 96 and 97 can protrude downward by means of a driving mechanism, such as a plunger. If the media tray 81 moves backward or forward in a state in which the protrusions 96 and 97 protrude downward, the CD moves in a state in which front tips of the protrusions 96 and 97 are in contact with the CD. As a result, a recording surface of the CD is mechanically destroyed and the CD cannot be read.

(Internal Processing of the Publisher 1)

Figure 6:
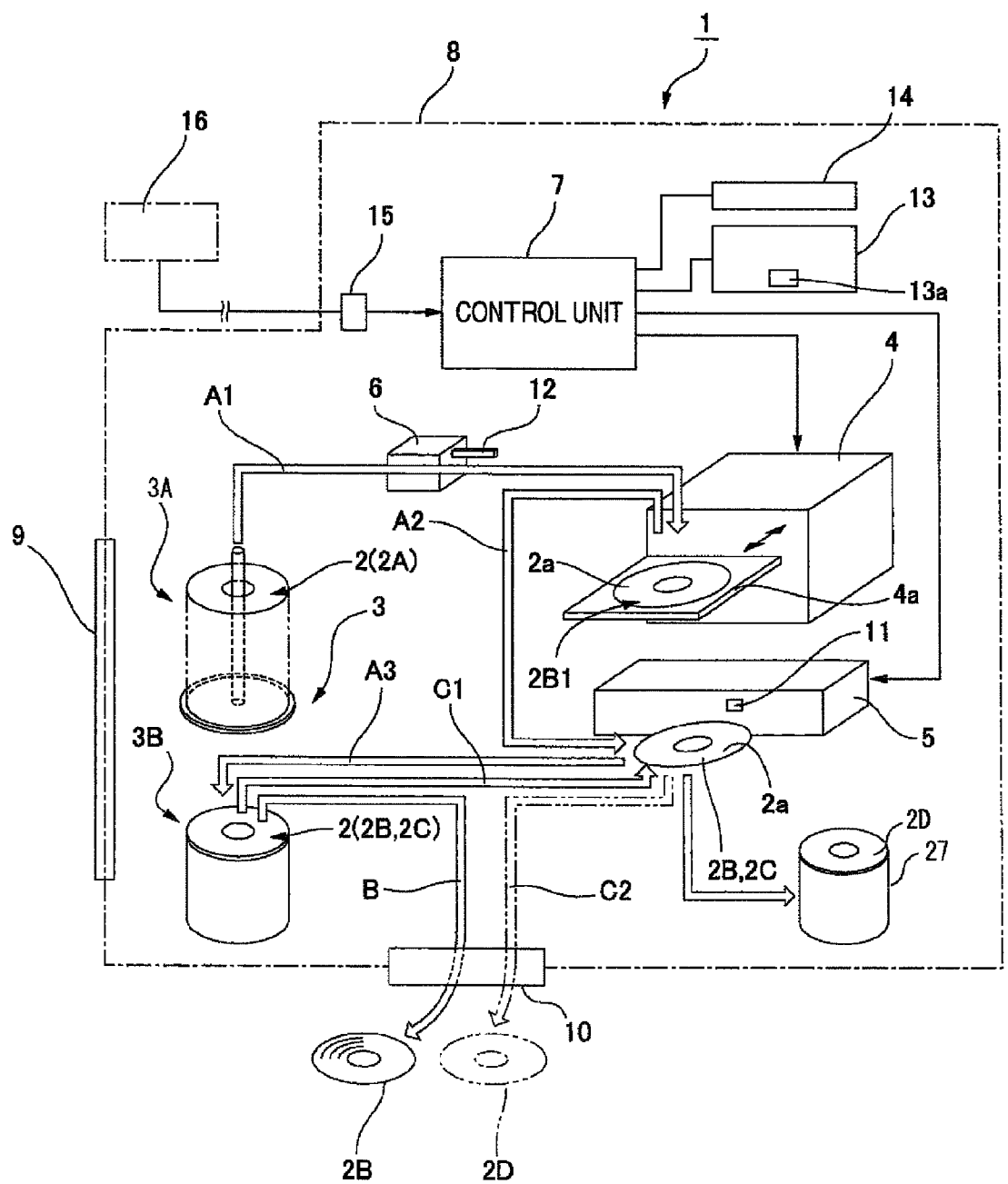
FIG. 6 is a view schematically illustrating the internal configuration of the publisher shown in FIG. 1.

FIG. 6 is a view schematically illustrating the internal configuration of the publisher 1. The publisher 1 has a control unit 7 that performs a control for each part. The control unit 7 serves as a central control unit which performs an operation control between respective parts, which will be described later, within the publisher 1. Specifically, the control unit 7 controls an operation of the media drive 4, the label printer 5, the media conveying mechanism 6, and the like.

In addition to a function of creating media, the publisher 1 includes the media disposal mechanism 11 for disposing of the media 2C, which is not necessary after creation, such that writing of data into the media 2C and reading of data from the media 2C are not possible, an image sensor for reading an image printed on a label surface of the used media 2C disposed of by the media disposal mechanism 11, for example, a line sensor 12 (image reading means) configured by using a CCD and the like, and a storage unit 13 for storing the read image, which is printed on the label surface, as media disposal history 13a caused by the media disposal mechanism 11.

As described above, the media disposal mechanism 11 causes the vertical protrusions 96 and 97 to mechanically damage a recording surface of the used media 2C by using the motion of the media tray 81 in the label printer 5, such that the used media 2C become the disposed media 2D in which data reading and data writing are not possible.

The line sensor 12 for reading an image printed on a label surface is mounted in the media conveying mechanism 6, for example. The used media 2C held by the media conveying mechanism 6 is rotated, such that the entire printed image on a label surface 2a is read by the line sensor 12 arranged along the radial direction of the media in a state where a light receiving surface faces the label surface 2a of the media 2C. Alternatively, the line sensor 12, which is arranged along the radial direction of the label surface 2a of the used media 2C held by the media conveying mechanism 6, may be rotated to read the entire printed image on the label surface 2a.

An operation unit 14 is connected to the control unit 7. The operation unit 14 is arranged with a group of alphanumeric character keys, such as a ten key, for inputting a password for authentication, a group of various kinds of function keys, and an indicator group, such as a state display lamp. In addition, the control unit 7 is connected with the authorized equipment 16 with a communication interface 15 (output means) interposed therebetween using a dedicated communication line or a normal communication line. In general, a media creation operation (a data writing operation and an operation of printing on a label surface), a media disposal history creation operation (an operation of reading an image printed on a label surface), a media disposal operation, and the like starts on the basis of a media creation command, a media disposal command, and the like supplied from the authorized equipment 16 to the control unit 7.

(Explanation on an Operation of the Publisher 1)

Figure 7:
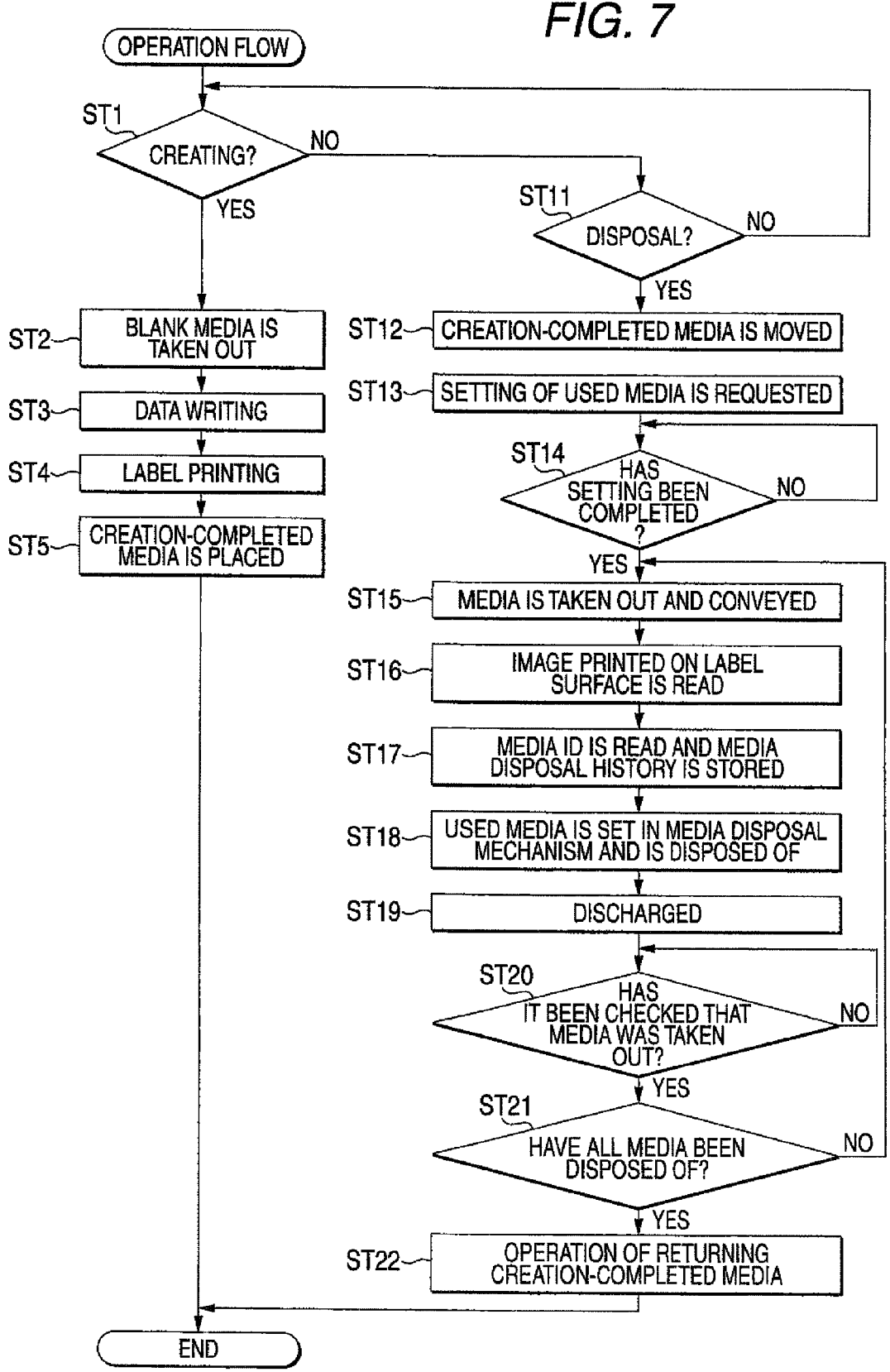
FIG. 7 is a flow chart schematically illustrating an operation of the publisher shown in FIG. 1.

FIG. 7 is a flow chart schematically illustrating an operation of the publisher 1 in this example. An operation will be described according to the flow chart. First, when a media creation command is received from the authorized equipment 16 (step ST1), the blank media 2A located at the top of the blank media storage unit 3A of the media storage unit 3 is taken out by the media conveying mechanism 6 (step ST2, arrow A1 of FIG. 5), the blank media 2A is set in the media drive 4, and data and a media ID for specifying the media are written, thereby creating a writing-completed media 2B1. In addition, the media ID, a name of the written data, a data structure, and the like of the writing-completed media 2B1 are stored in the storage unit 13 in a state in which the media ID, the name of written data, the data structure, and the like correspond to the writing-completed media 2B1 (step ST3).

Thereafter, the writing-completed media 2B1 is set in the label printer 5 and then label printing information and the ID are printed on the label surface 2a (step ST4, arrow A2 of FIG. 5). The media ID is printed in the form of a bar code, a two-dimensional bar code, an OCR character, a numeric character, a digital watermark, and the like. Moreover, information indicating that printing is completed is stored as label surface printing history in the storage unit 13. The created media 2B, which is created as described above, is placed in the created media storage unit 3B of the media storage unit 3 (step ST5, arrow A3 of FIG. 5). In addition, information on the storage location is stored in the storage unit 13.

If there is a media publication command from the authorized equipment 16, the created media 2B, which is created and stored in the created media storage unit 3B as described above, is taken out from the media storage unit 3B and is then conveyed up to the media outlet 10 so that the created media 2B can be taken out from the outside (arrow B of FIG. 5).

Then, if a media disposal command is received from the authorized equipment 16 (step ST11), the created media 2B stored in the created media storage unit 3B is temporarily moved to the blank media storage unit 3A (step ST12). After the created media storage unit 3B is emptied, for example, a message display for setting the used media 2C to be disposed of is performed through the indicator group of the operation unit 14 (step ST13). Since the door 9 is opened if an operator enters a password granted in advance and receives authentication, the used media 2C to be disposed of can be set in the created media storage unit 3B.

If it is checked that the used media 2C is set and the door 9 is closed (step ST14), an operation of disposing of the used media 2C using the media disposal mechanism 11 is started. First, the used media 2C is taken out by the media conveying mechanism 6 and is then conveyed to the media disposal mechanism 11 of the label printer 5 (step ST15, arrow C1 of FIG. 5). While the used media 2C is being conveyed, an image printed on a label surface of the used media 2C is read by the line sensor 12 (step ST16).

Here, the control unit 7 functions as an identification means for identifying a media ID from the read image printed on the label surface (reading means). If the control unit 7 identifies the media ID from the read image, the media disposal history 13a is stored in the storage unit 13 in a state where the media ID, the image printed on the label surface, disposal date and time, and a person in charge of the media disposal corresponds to each other.

The used media 2C set in the media disposal mechanism 11 is disposed of (step ST18). By causing the vertical protrusions 96 and 97 to mechanically damage a recording surface of the used media 2C using the motion of the media tray 81 of the label printer 5, the used media 2C is disposed of as the disposed media 2D in which data reading and data writing are not possible. The used media 2C after the disposal, that is, the disposed media 2D is conveyed up to the media outlet 10 by the media conveying mechanism 6 and is then discharged from the media outlet 10 (step ST19, arrow C2 of FIG. 5). As a result, an operator can take out the disposed media 2D from the media outlet 10. If it is checked that the disposed media 2D has been taken out (step ST20), an operation of disposing of the next used media 2C starts.

In addition, the disposed media 2D may be stored in the disposal stacker 27 for storing a CD to be discarded by using the media conveying mechanism 6. By using the disposal stacker 27, it is possible to collectively take out a predetermined number of sheets of disposed media 2D from the media outlet 10 without the need of taking out one sheet of disposed media 2D from the media outlet 10 at a time. Accordingly, even in the case when a plurality of sheets of disposed media exists, removing the disposed media is easily performed. In addition, the blank media 2A, the created media 2B, and the disposed media 2D may be stored so as to be clearly distinguished from each other.

If it is checked that the set used media 2C are completely disposed of and the created media storage unit 3B is emptied (step ST21), the created media 2B which were moved to the blank media storage unit 3A are returned to the created media storage unit 3B (step ST22). Thus, a series of operations of disposing of used media are completed.

As a result, a media ID, an image printed on a label surface, a disposal date and time, and a person in charge of disposal of each of the disposed media 2D remain in the storage unit 13 as the media disposal history 13a caused by the media disposal mechanism 11. Accordingly, for example, when the authorized equipment 16 refers to the media disposal history 13a of the media disposal mechanism 11, the disposed media 2D can be checked. Further, by referring to an image printed on a label surface, written data of disposed media can also be checked through a title and the like of the written data printed on the label surface. Furthermore, by operating such that the publisher 1 transmits the media disposal history 13a to the authorized equipment 16 and disposal history information from the publisher 1 is recorded in the database DB of the authorized equipment 16 in response to a request from the authorized equipment 16, the media disposal history may be managed even in the authorized equipment 16.

Thus, since creation of media to disposal of the media can be managed using the publisher 1 in this example, the publisher 1 is suitable for handling media in which secret data and the like are written.

Moreover, when the message display for making the used media 2C to be disposed of is performed in step ST13, if media externally created is set in the created media storage unit 3B and the media is disposed of by the media disposal mechanism 11, a label-surface-printed image printed on externally created media remains as the disposal history in the storage unit 13. Accordingly, by checking the disposal history, it is possible to specify the disposed media and also check the details of the written data. As a result, not only media created in the publisher 1 but also media created externally and disposed of can be checked after disposal, which is very convenient.

Furthermore, the media disposal mechanism 11 in this example is a mechanism that disposes of the media 2C, which is conveyed by the media tray 81 of the label printer 5, by damaging a recording surface of the media 2C using a plurality of protrusions which can expand and contract by a driving mechanism, such as a plunger. Alternatively, the recording surface of the media 2C may also be mechanically destroyed using an in-and-out operation of the media tray 4a of the CD drive 4 (refer to FIG. 6). Moreover, when a serial type ink jet printer or the like is used as the label printer 5, the recording surface of the media 2C may also be mechanically destroyed using a motion of a head carriage that supports a print head. In addition, the recording surface of the media 2C may also be mechanically destroyed using a media conveying operation of the media conveying mechanism 6.

In addition, as the media disposal mechanism 11, a mechanism for chemically destroying the recording surface or a mechanism for optically destroying the recording surface may be used in addition to the mechanism for mechanically destroying the recording surface. The mechanism for chemically destroying a recording surface includes dissolving or oxidizing the recording surface by coating or spraying special ink on the media 2C and melting or thermally changing the recording surface using a heat roller or the like. Furthermore, the optical mechanism includes a mechanism that destroys the recording surface by irradiating a high-output laser onto the recording surface of a CD using an optical head of a media drive. In the case of a CD-RW or the like, it is needless to say that all written data can be deleted without destroying a recording surface. Moreover, in the case of a CD-R or the like, it is also possible to make data not readable, for example, by overwriting meaningless data.

In addition, it is also possible to make data not readable by performing printing on a data writing surface of the media 2C using the label printer 5.

As a means for reading an image printed on a label surface, it is also possible to collectively read the entire label surface using a two-dimensional sensor, which is formed by using a CCD and the like, instead of the line sensor 12.

In the above example, creation and disposal of a CD and a DVD have been described. However, the present invention may also be applied to a case of performing creation and disposal of media based on other formats, such as a semiconductor memory and a magnetic recording medium, as well as the optical disk, such as a CD and a DVD, and a magneto-optic disk. In this case, as an external recording medium writing device, it is possible to use an external recording medium writing device that performs writing and publication operations on external recording media based on a single format or an external recording medium writing device having a function of performing writing and publication operations on external recording media based on different formats.

The invention claimed is:

1. A media processor comprising:

a media disposal section operable to dispose of media so as to make writing and reading of data on the media impossible;

an image reading section operable to read a label surface image printed on a label surface of the media, wherein the media are disposed of by the media disposal section after the label surface image is read by the image reading section; and a storage operable to store the label surface image as media disposal history.

2. The media processor according to claim 1, further comprising a reading section operable to read media identification information included in the label surface image read by the image reading section.

3. The media processor according to claim 1, further comprising an output section operable to output the label surface image to the outside.

4. The media processor according to claim 1, further comprising:
   a media drive operable to perform writing and reading of data with respect to the media; and
   a label printing section operable to perform printing on the label surface of the media.

5. The media processor according to claim 4, further comprising:
   a media storage operable to store unused blank media;
   a written media storage operable to store media in which data is written by the media drive; and
   a disposed media storage operable to store media disposed of by the media disposal section.

6. A control method of a media processor that writes data into media, and reads written data, comprising:
   reading a label surface image printed on a label surface of the media in response to a command of disposal of the media;
   disposing of the media so as to make writing and reading of data on the media impossible; and
   storing the label surface image as media disposal history.

7. The control method of a media processor according to claim 6, wherein media identification information included in the label surface image is read in the reading.

8. The control method of a media processor according to claim 6, further comprising:
   writing data into the media; and
   performing printing on a label surface of the media.

* * * * *